United States Patent
Ko et al.

(10) Patent No.: US 9,282,616 B2
(45) Date of Patent: Mar. 8, 2016

(54) VEHICLE HAVING LAMP

(71) Applicant: Hyundai Motor Company, Seoul (KR)

(72) Inventors: Kwang Min Ko, Suwon-si (KR); Jeong Gi Kim, Hwaseong-si (KR); Jongsik Bae, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 226 days.

(21) Appl. No.: 14/010,418

(22) Filed: Aug. 26, 2013

(65) Prior Publication Data

US 2014/0252949 A1    Sep. 11, 2014

(30) Foreign Application Priority Data

Mar. 8, 2013  (KR) .......................... 10-2013-0025207

(51) Int. Cl.
| | |
|---|---|
| B60Q 1/14 | (2006.01) |
| H05B 37/02 | (2006.01) |
| F21S 8/10 | (2006.01) |
| B60Q 1/22 | (2006.01) |
| B60Q 1/26 | (2006.01) |
| B60Q 1/38 | (2006.01) |

(52) U.S. Cl.
CPC ........... *H05B 37/02* (2013.01); *B60Q 1/22* (2013.01); *B60Q 1/2607* (2013.01); *B60Q 1/38* (2013.01); *F21S 48/20* (2013.01); *F21S 48/215* (2013.01); *F21S 48/234* (2013.01)

(58) Field of Classification Search
None
See application file for complete search history.

(56) References Cited

U.S. PATENT DOCUMENTS

| | | | | |
|---|---|---|---|---|
| 6,260,990 | B1 * | 7/2001 | Saunders | G06Q 1/2692 362/459 |
| 8,441,194 | B2 * | 5/2013 | Huang | B60Q 1/2607 315/76 |
| 2003/0206418 | A1 * | 11/2003 | Strazzanti | B60Q 1/00 362/540 |
| 2012/0075875 | A1 * | 3/2012 | Son et al. | 362/487 |
| 2012/0155105 | A1 * | 6/2012 | Emerson | B60Q 1/2607 362/543 |
| 2012/0170296 | A1 * | 7/2012 | Ostrowski et al. | 362/519 |
| 2013/0249394 | A1 * | 9/2013 | Fay | B60Q 1/0088 315/77 |
| 2013/0343075 | A1 * | 12/2013 | Schirmer et al. | 362/516 |
| 2014/0268858 | A1 * | 9/2014 | Norris et al. | 362/545 |

FOREIGN PATENT DOCUMENTS

| | | |
|---|---|---|
| JP | 2008-021516 A | 1/2008 |
| JP | 2010-153259 A | 7/2010 |
| KR | 20-0387489 Y1 | 6/2005 |
| KR | 10-0803310 B1 | 2/2008 |
| KR | 2008-0012182 A | 2/2008 |
| KR | 10-2012-0085421 A | 8/2012 |

* cited by examiner

*Primary Examiner* — Cassandra Cox
(74) *Attorney, Agent, or Firm* — McDermott Will & Emery LLP

(57) ABSTRACT

A vehicle having a lamp includes a multi lamp disposed to radiate a first color light for backward movement or a second color light for a turn movement of a vehicle. A turn lamp is disposed near the multi lamp portion to selectively radiate a second color light for a turning movement. A controller controls the operation of the multi lamp and the turn lamp depending on a turn signal or a reverse signal.

9 Claims, 6 Drawing Sheets

VEHICLE HAVING LAMP

CROSS-REFERENCE TO RELATED APPLICATION

This application claims priority to and the benefit of Korean Patent Application No. 10-2013-0025207 filed in the Korean Intellectual Property Office on Mar. 8, 2013, the entire contents of which are incorporated herein by reference.

TECHNICAL FIELD

The present disclosure relates to a vehicle having a lamp that effectively informs a moving direction of a vehicle to other vehicles or pedestrians by lighting a turn lamp or a reverse lamp according to a signal.

BACKGROUND

Generally, a preceding vehicle travelling in a dark area or at night has a system for offering information to following vehicles, such as, a stop lamp R/L, a turn lamp (turn signal lamp R/L), a tail lamp R/L, a rear marker lamp R/L, a reverse lamp R/L, or vehicle license number lamp.

As an example, a rear combination lamp includes a turn lamp for displaying left turn or right turn of a vehicle, a reverse lamp for backward movement, and a brake lamp that is lighted when the brakes are applied such as when decelerating or stopping.

A turn signal lamp switch (not shown) operates the turn lamp, and a reverse movement gear (not shown) operates the reverse lamp. The brake lamp is automatically lighted by pressing a brake pedal (not shown).

The turn lamp is only for turning, and the reverse lamp is only for the backward movement, and thus design and visibility of a rear combination lamp of a vehicle is limited. The rear combination lamp having a relatively narrow area can be further complicated by including various lamps.

The above information disclosed in this Background section is only for enhancement of understanding of the background of the disclosure, and therefore may contain information that does not form the prior art already known in this country to a person of ordinary skill in the art.

SUMMARY

The present disclosure has been made in an effort to provide advantages for a vehicle having a lamp by improving visibility for a driver of another vehicle or a pedestrian, and design flexibility using a common reverse lamp and a turn lamp according to a driving condition.

According to an embodiment of the disclosure, a vehicle having a lamp may include a multi lamp radiating first color light for backward movement or second color light for a turning movement. A turn lamp is disposed near the multi lamp to selectively radiate the second color light for a turning movement. A controller is configured to control the operation of the multi lamp and the turn lamp depending on a turn signal for a turn movement and a reverse signal for a backward movement of the vehicle. In an embodiment of the present disclosure, the controller may control the multi lamp and the turn lamp to radiate the second color light when the turn signal for the turning movement is generated, and control the multi lamp portion to radiate a first color light for backward movement when only the reverse signal is generated. The controller may further control the multi lamp portion to radiate the first color light for the backward movement and the turn lamp to radiate the second color for the turning movement of a vehicle when both signals are simultaneously generated.

The multi lamp and the turn lamp may be disposed in a rear combination lamp disposed in a rear end of a vehicle.

The multi lamp and the turn lamp may include plurality of lamps disposed along a predetermined line. The multi lamp may use an LED to radiate light.

According to the present disclosure, the multi lamp may include a reverse light source for radiating a first color light for a backward movement and a turn light source disposed near the reverse light source to radiate a second color light for a turning movement. The multi lamp may further include a reflector for reflecting the light radiated from the reverse light source and the turn light source. The reflector includes a first reflector reflecting the light radiated from the reverse light source with a predetermined angle, and a second reflector disposed near the first reflector reflecting the light radiated from the turn light source with a predetermined angle.

Both the reverse light source and the turn light source of the multi lamp may be disposed in a light emitting area.

As described above, in a vehicle having a lamp, a multi lamp performs a turn lamp function together with a turn lamp or a reverse lamp function according to a driving condition to improve the visibility and improve the design flexibility of the rear combination lamp.

While a vehicle moves forward, an area of the turn lamp is extended to improve the visibility for a driver of another vehicle and the efficiency of the rear combination lamp. Further, costs can be saved by eliminating a separate reverse lamp.

DETAILED DESCRIPTION OF THE EMBODIMENTS

An exemplary embodiment of the present disclosure will hereinafter be described in detail with reference to the accompanying drawings.

Figure 1:
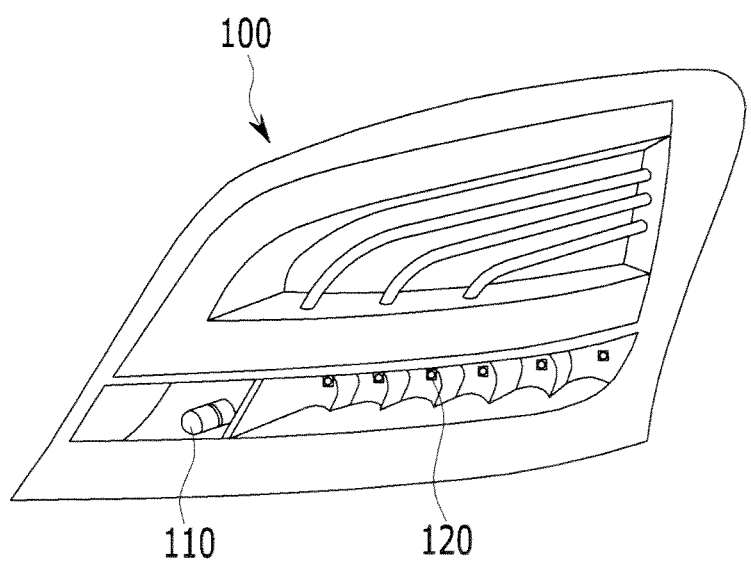
FIG. 1 is a partial front view showing a lamp of a vehicle of the present disclosure.

FIG. 1 is a partial front view showing a lamp of a vehicle according to the disclosure.

Referring to FIG. 1, a rear combination lamp 100 of a vehicle includes a reverse lamp 110 and a turn lamp 120 arranged in a width direction of a vehicle at a lower portion thereof.

When a driver operates a shift lever in a backward movement condition, the reverse lamp 110 is lighted to inform other vehicle or a pedestrian of the backward movement of a vehicle. The turn lamp 120 is lighted by a turn signal to inform another vehicle or a pedestrian of the turning direction of a vehicle.

Figure 2:
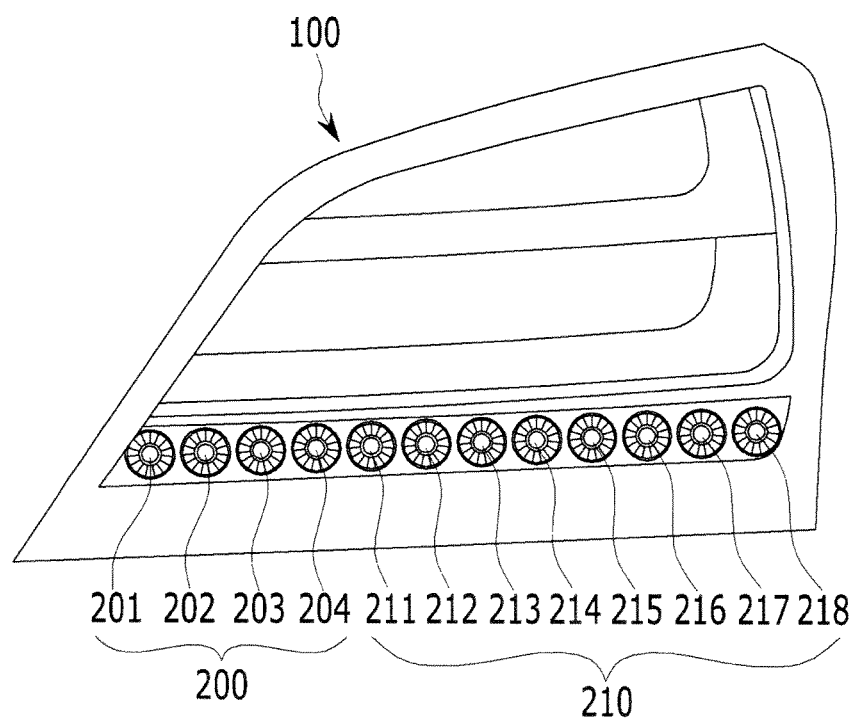
FIG. 2 is a partial front view showing a lamp of a vehicle according to an exemplary embodiment of the present disclosure.

FIG. 2 is a partial front view showing a lamp of a vehicle according to an exemplary embodiment of the present disclosure. Referring to FIG. 2, a rear combination lamp 100 includes a multi lamp 200 and a turn lamp 210.

The multi lamp portion 200 includes a first multi lamp 201, a second multi lamp 202, a third multi lamp 203, and a fourth multi lamp 204. The turn lamp portion 210 includes a first turn lamp 211, a second turn lamp 212, a third turn lamp 213, a fourth turn lamp 214, a fifth turn lamp 215, a sixth turn lamp 216, a seventh turn lamp 217, and an eighth turn lamp 218.

If a reverse signal is generated for a backward movement, all lamps in the multi lamp 200 are lighted to effectively inform other vehicles or pedestrians of the backward movement.

The turn lamp 210 and the multi lamp 200 are lighted by a turn signal to inform other vehicles or pedestrians of right or left turn of the vehicle.

The multi lamp 200 is disposed to irradiate first color light for a backward movement or second color light for a turning movement. The turn lamp 210 is disposed near the multi lamp 200 to selectively irradiate the second color light for turning.

When only a turn signal is generated, the multi lamp 200 and the turn lamp 210 simultaneously irradiate a second color light. When both the turn and reverse signal are simultaneously generated, the multi lamp 200 irradiates the first color light, and the turn lamp 210 irradiates the second color light.

When only the reverse signal is generated, the multi lamp 200 irradiates the first color light to display the backward movement.

Figure 3:
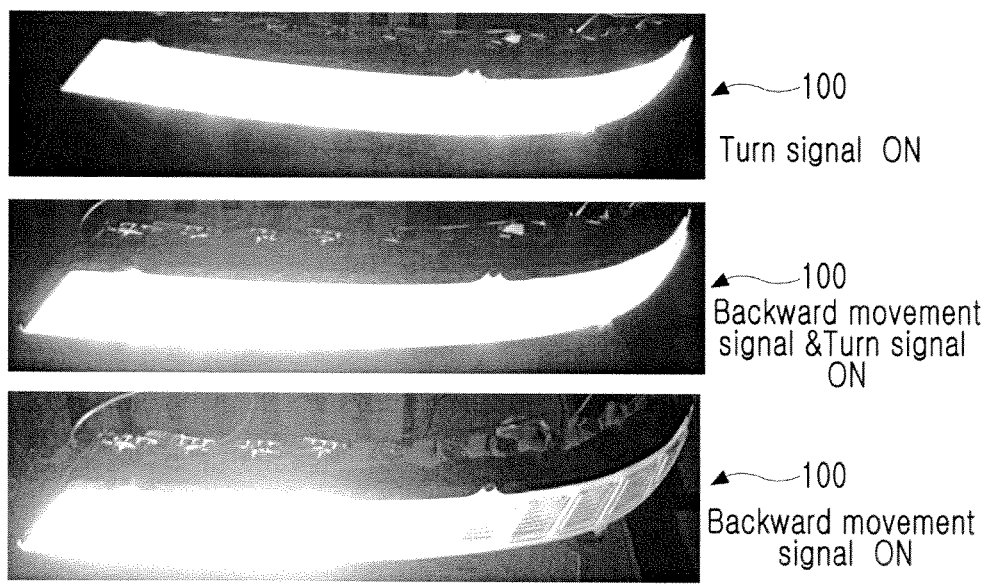
FIG. 3 is a photograph showing a state of a lamp of a vehicle is operated according to an exemplary embodiment of the present disclosure.

FIG. 3 is a photograph showing a state which a lamp of a vehicle is being operated according to an exemplary embodiment of the present disclosure.

Referring to FIG. 3, when only the turn signal is generated, both the multi lamp 200 and the turn lamp 210 irradiate the second color light for turning.

If both the reverse and turn signals are generated, the multi lamp 200 irradiates the first color light for the backward movement, and the turn lamp 210 irradiates the second color light for the turning movement. If only the reverse signal is generated, the multi lamp 200 irradiates the first color light for a backward movement.

Figure 4:
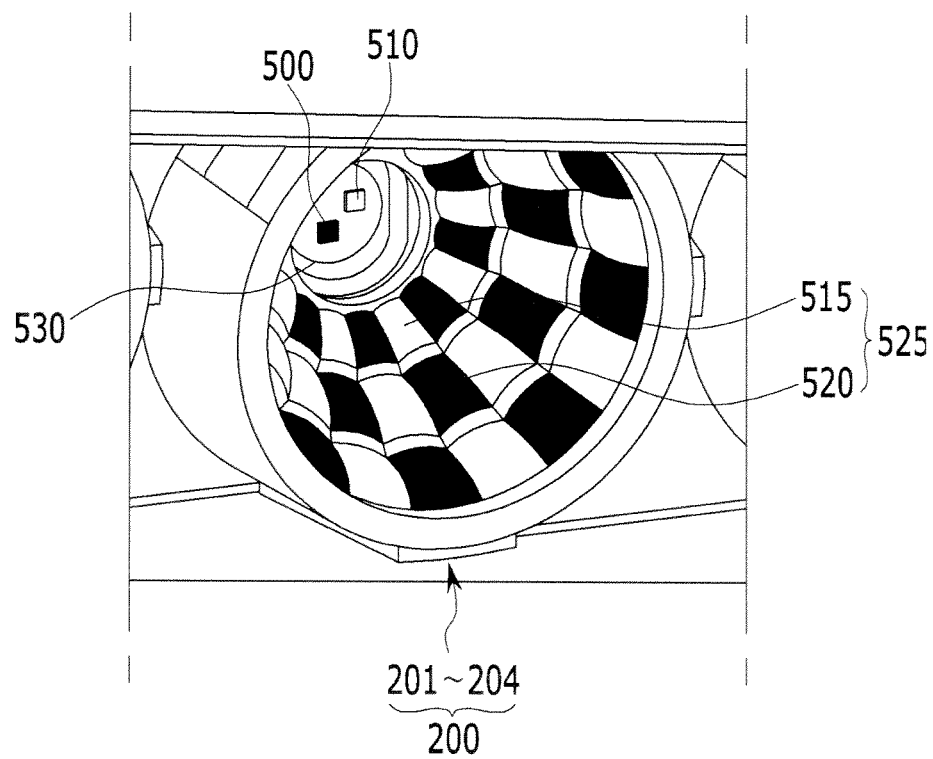
FIG. 4 is a partial perspective view of a lamp of a vehicle according to an exemplary embodiment of the present disclosure.
Figure 5:
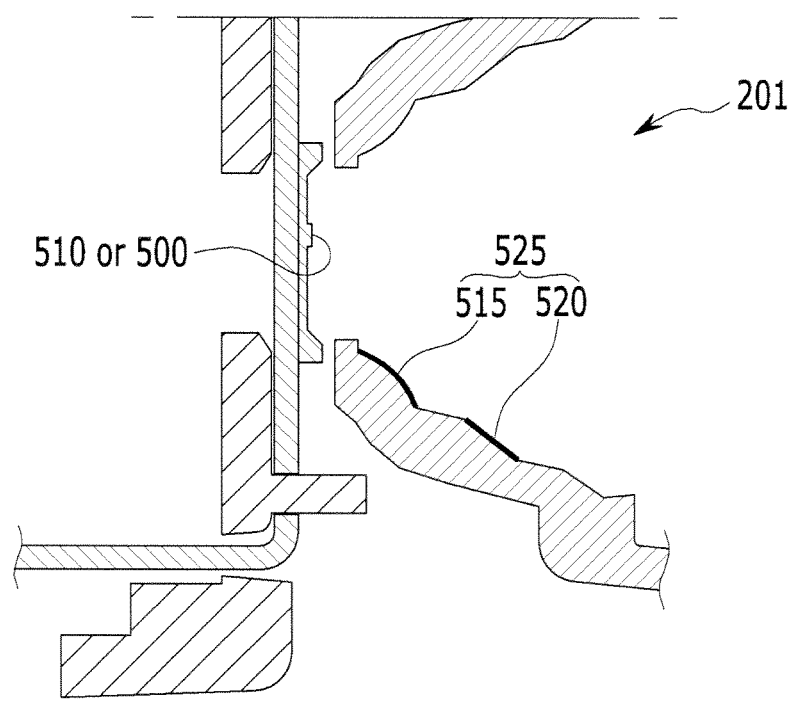
FIG. 5 is a partial cross-sectional view of a lamp of a vehicle according to an exemplary embodiment of the present disclosure.

FIG. 4 is a partial perspective view of a lamp of a vehicle, and FIG. 5 is a partial cross-sectional view of a lamp of a vehicle.

Referring to FIG. 4 and FIG. 5, the first, second, third, and fourth multi lamp (201, 202, 203, and 204) of the multi lamp 200 respectively includes a reverse light source 500 and a turn light source 510. A reflector 525 includes a first reflector 515 and a second reflector 520.

The reverse light source 500 may include a LED to radiate a first color light for a backward movement. The turn light source 510 may include a LED to radiate the second color light for a turning movement. The reverse light source 500 and the turn light source 510 are disposed in a light emitting area close to each other so as to be seen as one radiating body from a distance. The first reflector 515 reflects the reverse light source 500 in a predetermined angle to satisfy a diver's angle of view. The second reflector 520 reflects the turn light source 510 in a predetermined angle.

Figure 6:
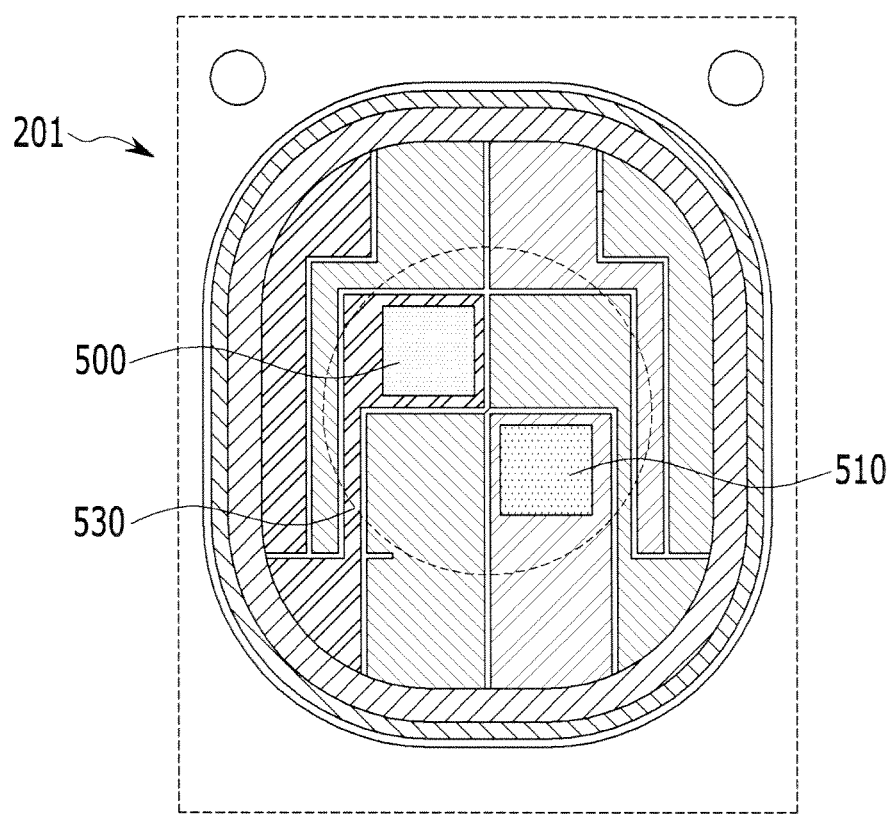
FIG. 6 is a partial detail top plan view of a lamp of a vehicle according to an exemplary embodiment of the present disclosure.

FIG. 6 is a partial detail top plan view of a lamp of a vehicle according to an exemplary embodiment of the present disclosure. Referring to FIG. 6, the first multi lamp 201 includes a light emitting area 530 in which a reverse light source 500 and a turn light source 510 are disposed. The reverse light source 500 may include a white color LED having different shades, and the turn light source 510 may include a yellow color LED having different shades. The reverse light source 500 and the turn light source 510 may be one LED package.

As described above, the multi lamp 200 performs a turn lamp function or a reverse lamp function according to a driving condition to improve visibility. Further, the design flexibility of the rear combination lamp 100 can be improved.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vehicle having a lamp, comprising:
   a multi lamp that is disposed to radiate a first color light for a backward movement or a second color light for a turning movement of a vehicle;
   a turn lamp that is disposed near the multi lamp to selectively radiate a second color light for the turning movement of the vehicle; and
   a controller that is configured to control the operation of the multi lamp and the turn lamp depending on a turn signal for a turning movement and a reverse signal for a backward movement of the vehicle,
   wherein the multi lamp portion includes: a reverse light source for radiating the first color light for the backward movement of the vehicle; and a turn light source that is disposed near the reverse light source to radiate the second color light for the turning movement of the vehicle.

2. The vehicle having a lamp of claim 1, wherein the controller controls the multi lamp and the turn lamp to radiate the second color light, if the reverse signal for the backward movement of the vehicle is not generated and the turn signal for the turning movement of the vehicle is generated.

3. The vehicle having a lamp of claim 1, wherein the controller controls the multi lamp portion to radiate the first color light for the backward movement of the vehicle, if the turn signal for the turning is not generated and the reverse signal for the backward movement of the vehicle is generated.

4. The vehicle having a lamp of claim 1, wherein the controller controls the multi lamp to radiate the first color light for the backward movement of the vehicle and controls the turn lamp to radiate the second color for the turning movement, if the reverse signal for the backward movement of the vehicle and the turn signal for the turn movement of the vehicle are simultaneously generated.

5. The vehicle having a lamp of claim 1, wherein the multi lamp portion and the turn lamp portion are disposed in an area of a rear combination lamp that is disposed in a rear end of the vehicle.

6. The vehicle having a lamp of claim 5, wherein the multi lamp portion and the turn lamp portion include plurality of lamps that are disposed along a predetermined line.

7. The vehicle having a lamp of claim 1, wherein the multi lamp portion includes a reflector for reflecting the light that is radiated from the reverse light source and the turn light source, and
   the reflector includes:
   a first reflector that reflects a light radiated from the reverse light source with a predetermined angle; and
   a second reflector that is disposed near the first reflecting portion to reflect a light radiated from the turn light source with a predetermined angle.

8. The vehicle having a lamp of claim 1, wherein the multi lamp portion or the turn lamp portion uses an LED to radiate light.

9. The vehicle having a lamp of claim 1, wherein the reverse light source and the turn light source of the multi lamp portion are disposed in one light emitting area.

\* \* \* \* \*